Patented Dec. 28, 1937

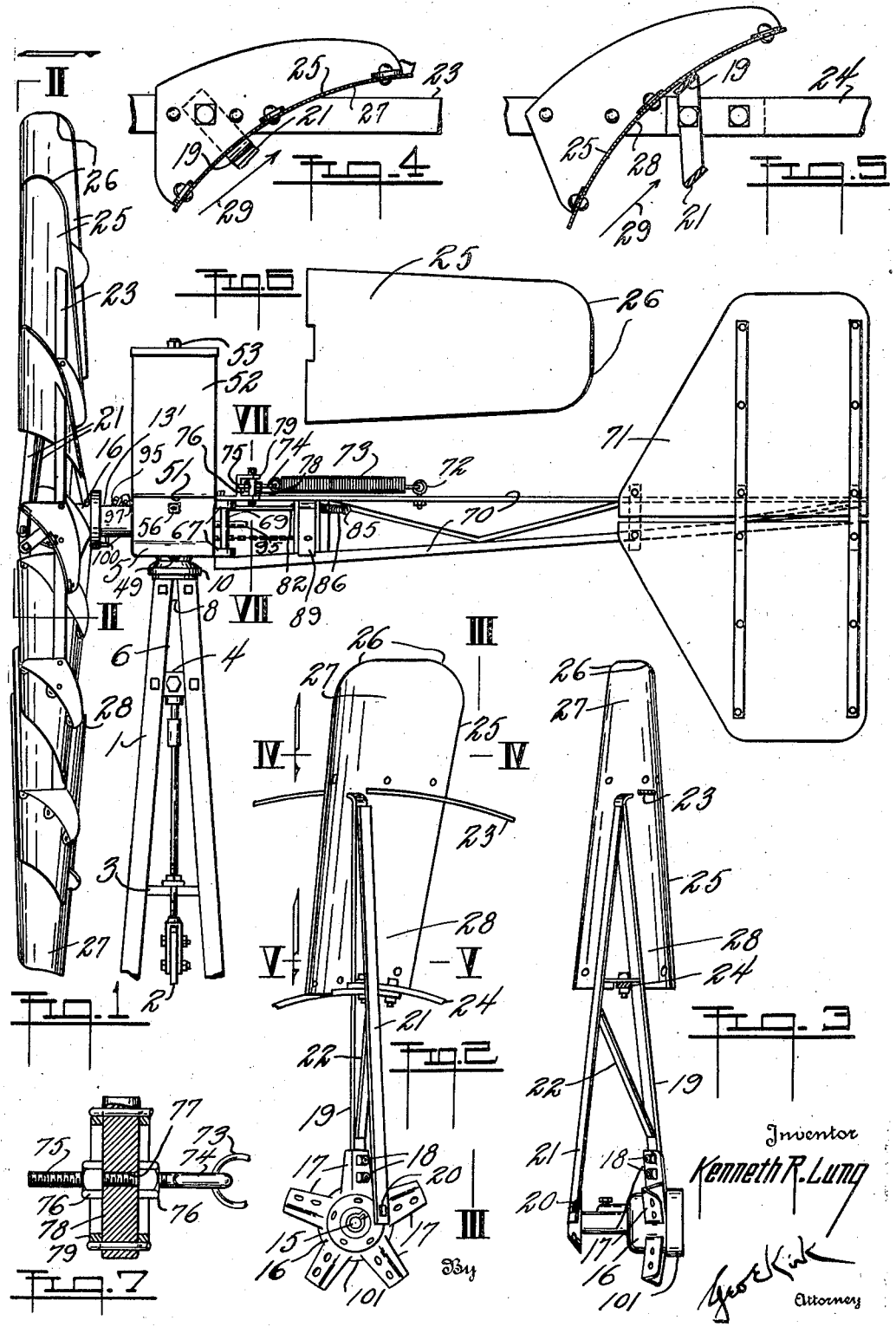
Dec. 28, 1937.     K. R. LUNG     2,103,910
WINDMILL
Filed Jan. 25, 1937     2 Sheets-Sheet 1
Inventor
Kenneth R. Lung
Attorney

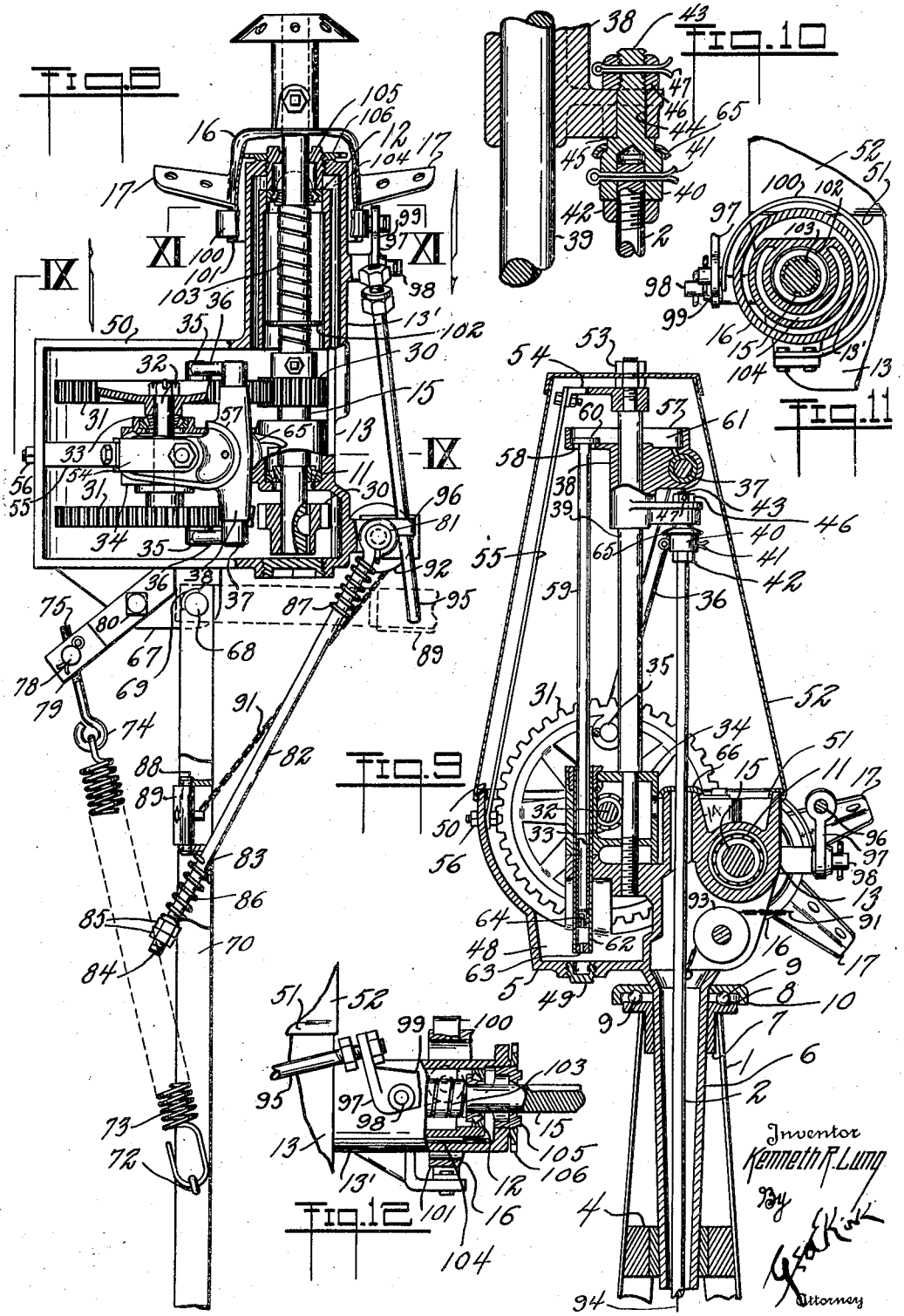

2,103,910

UNITED STATES PATENT OFFICE 2,103,910

WINDMILL

Kenneth R. Lung, Kendallville, Ind., assignor to Flint & Walling Manufacturing Company, Kendallville, Ind., a corporation of Indiana Application January 25, 1937, Serial No. 122,204

9 Claims. (Cl. 170—46)

This invention relates to wind wheel motors.

This invention has utility when incorporated in assembly and construction features of efficiency in varying wind velocities, with economies in manufacture, mounting, and operation.

Referring to the drawings:

Fig. 1 is a fragmentary view in side elevation of an embodiment of the invention in a windmill;

Fig. 2 is a view of a blade or portion of the wind wheel of the windmill of Fig. 1 from the support or tower side of the wheel, on the line II—II, Fig. 1;

Fig. 3 is a view on the line III—III, Fig. 2;
Fig. 4 is a section on the line IV—IV, Fig. 2;

Fig. 5 is a section on the line V—V, Fig. 2;

Fig. 6 is a detail view of the blank for the blade or fan of the wind wheel;

Fig. 7 is a detail view of the governing spring mounting or connection on the line VII—VII, Fig. 1;

Fig. 8 is a fragmentary plan view of the mill of Fig. 1 with the transmission cover removed and parts broken away;

Fig. 9 is a section on the line IX—IX, Fig. 8;

Fig. 10 is an enlarged view of the swivel mounting connection between the pump rod and crosshead;

Fig. 11 is a view of the brake for the windmill on the line XI—XI, Fig. 8; and Fig. 12 is a view of the brake operating connections.

Wind wheel tower 1 is shown having rising therethrough reciprocating pump rod 2 centered by spiders 3, 4, as a guide. Mounted on this windmill tower 1 is support 5 having depending tapering stem 6 (Fig. 9) entering the spider 4 in providing a guide for the pump rod 2 to extend upward therethrough. This portion 6 of the housing 5 is centered at the top of the tower 1 by bearing member 7 having race 8 for annular series of balls 9 in providing an anti-friction bearing or swivel over which extends cap 10 carrying this support or housing 5.

This support carries anti-friction bearings 11, 12, (Fig. 8) in portions 13, 13', offset to one side of the pump rod 2 as extending upward through this support 5. In these bearings 11, 12, is wind wheel shaft 15 carrying outboard from this support 5 hub 16 (Figs. 2, 3) with minor stems 17 as a spider. Bolts 18 mount radially extending straps 19, and bolts 20, radially extending strut straps 21, outwardly connected to the straps 19. Between the straps 19, 21, brace straps 22 extend for stiffening the straps 21. The respective straps 19, 21, 22, are at an angle to the plane of the series of these arms as well as at an angle to the axis of the shaft 15. These straps 19, 21, 22, provide radiating arms in the plane of the wind wheel, which arms locate outer ring 23 and inner ring 24 concentric of the shaft 15. At these arms, and fixed with the rings, are located blades 25 having rounded outer termini portions 26. These blades have outer shallower dished portion 27 (Fig. 4) and inner wider, more deeply dished portion 28 (Fig. 5) providing a projected blade with more effective wind resistance inward than outward in compensation for slippage connection as reduced in the outer higher speed portion over that inward therefrom. This wind wheel, has normal operative position axially into the wind. The direction of the wind is then at the impact across the blades which is approximately in the direction of arrows 29 and approximately parallel with the broader or strap-wise dimension of the arms. There is accordingly efficiency purpose in locating the arms narrow-wise as to the wind flow for such thereby reduces resistance to the wheel rotation.

On the shaft 15, on either side outboard from the bearings 11, are fixed pinions 30, each in mesh with a gear 31. These gears 31 are mounted on shaft 32 carried by anti-friction bearings 33 in block 34 rising in the support 5. This shaft 32 is rotary with bearings therefor instead of bearings for the gears as to the shaft. The shaft 15 is offset laterally as to the gear shaft 32 with the clearance therebetween for the pump rod 2. Each of these gears 31 carries wrist pin 35 from which extends connecting rod or pitman 36 to pin 37 in cross-head 38 reciprocable along cross head guide 39 rising from the support 5 between the pump rod 2 and the shaft 32. This pin 37 is located directly over the line of the shaft 2, thereby directing the lift action of this wind wheel for direct pull on the pump rod 2.

The pump rod 2 (Fig. 10) has cap fitting 40 thereon anchored by cotter 41 and stiffened in its connection by threaded lock nut 42. This cap fitting 40 has stem 43 therefrom extending through eye 44 in the cross-head 38 with shoulder 45 therebelow. Mounted on this stem 43 is brass nut 46 anchored by cotter pin 47 in providing a bearing or swivel readily adjustable as to the cross-head eye 44 to take up wear between the shoulder 45 and the nut 46 and readily upwardly removable for replacement. This provides a swivel connection between the power or wind motor and the driven rod 2 above the support 5, allowing the wind motor to take direction of the wind or wind change, independently of twisting or turning action in the reciprocating driven member away from the cross-head 38.

This support 5 has reservoir portion 48 (Fig. 9) for the gear wheels 31. A plug 49 may be removed to drain this well, say of lubricant and then replaced. The support 5 upwardly from this reservoir portion 48 terminates in a rib 50, with which may interfit channel 51 of housing or cap 52 upwardly therefrom and assembled to be held therewith by nut 53 on extension from the cross-head guide 39. This cross-head guide 39 within this housing 52 is stiffened against vibration by arm 54 and strut 55 extending to bolt 56 in the support 5.

The cross-head 38 is shown carrying upwardly extending flange 57 adjacent opening 58 therein. Through this opening 58 extends tubular stem 59 having enlargement 60 in its loose connection with the cross-head 38 at chamber portion 61 provided by the flange 57. This tubular stem 59 is effective as a piston of a piston pump in entering cylinder 62 fixed with the support 5 and entering the reservoir 48 and which terminates in port 63. Adjacent said port 63 is check valve 64. As the plunger 59 strikes this check valve 64, the stroke of this pump is thus stopped and the enlargement 60 rises in the chamber 61. There is thus provided a reduced stroke pump relatively to the stroke for the cross-head 38, which pump is effective in normal operation of this transmission between the wind wheel shaft 15 and the pump rod 2 for elevating lubricant in the chamber 48 by way of the tubular pump rod 59 into the chamber 61 for spill or overflow therefrom upon the gears, pinions, pitman, or connecting rods, as well as the bearings and shafts. This spill is confined to this support, for even as passing to the pin 37 and the swivel it may not fall down on the rod 2 because of skirt 65 (Fig. 10) below the swivel and skirt 66 about the rod 2 at the opening through the support.

Between the lines of the shafts 15 and 32 and closer to the latter, this support 5 has ears 67 providing pivot bearing with axis parallel to the axis of the support 5 relatively to the tower 1. These ears 67 have therein porous, bronze, graphite-impregnated bushings 68 providing self-lubricating mounting bearings for pin 69 of arms 70 (Fig. 8) carrying rudder plane 71 remote from the support 5, which plane is of effective area region beyond that of the wind wheel when this arm 70 and plane of the windmill are parallel.

The arm 70, spaced from the pivot pin 69, carries eye 72 to which is connected tension governor spring 73 extending inward to eye 74 (Fig. 7) having threaded portion 75 carrying nuts 76. This eye 74 in its extent to threaded portion 75 protrudes through opening 77 in stem 78 mounted in bracket 79 (Fig. 8), connected by bolt 80 with an ear 67. This eye 74 is accordingly positioned laterally from the pin 69 more remote from the shaft 15 than the pin 69. The nuts 76 on the threaded portion 75 provide ready means for adjusting the action of this governor spring 73 as to the tension or wind strain necessary to hold the wind wheel into the wind or to buckle or swing relatively to the support in reefing or pulling the wheel out of the wind as the rudder 71 remains in the wind.

The support 5, remote from the bracket 79 has pin 81 to which is connected bolt 82 extending through opening 83 in the arm 70 and having threaded terminus 84 with which are engaged nuts 85 in locating bumper compression helical spring portion 86 at this arm 70 as a cushioning take-up in the pull of the arm away from the plane of the wind wheel. On this bolt 82 adjacent the pin 81 there is additional helical compression spring 87 as a reverse direction bumper to cushion impacts of the arm 70 as swinging into parallelism with the wind wheel. Accordingly, this bolt 82 carries two direction cushioning means or bumpers for the rudder arm operation.

The rudder arm 70 has pivot pin 88 from which depends latch 89 swingable against lower arm 70 as drawn by pull-out chain 91 extending from this latch 89 over guide pulleys 92 and thence about guide pulley 93 to pull-out wire 94 extending through the tubular stem 6 for manual operation, which as effective in pulling the wind wheel out of gear, brings this latch 89 against the rudder to swing the rudder 71 into parallelism with the wind wheel.

In this pulling out of gear with the latch 89 against the arm 70 and so firmly held by the pull-out connections, as this arm 70 swings into parallelism with the wind wheel, the latch 89 strikes bolt 95, thrusting such through its guide portion 96 in the support. This bolt 95 is connected to arm 97 (Figs. 8, 12) having rockable mounting at pivot pin 98 with the support 5. Fixed with this arm 97 is arm 99 connected to spring brake band 100 (Fig. 11), normally free due to its spring action from brake drum 101 fixed as a part of the hub 16. Accordingly, as this latch 89 pushes this bolt or rod 95, the brake is normally effective for catching and holding the wind wheel against rotation.

However, in automatic operation for throwing the wind wheel out of gear by the wind action on the rudder 71 through the control over the governor spring 73 there is no pull by the pull-out chain 91 against the latch 89. Accordingly, as this bolt 95 comes in contact with the latch 89, the latch 89 is swung relatively to the arm 70 and the spring action of the brake band 100 holds this rod 95 to thrust the latch 89 and thereby not set the brake so that the wheel may idly spin or come slowly to stopping position.

Lubricant may be supplied to bearing 12, mounted in tubular portion 13', by means of oil ring 102 feeding oil groove 103 on the shaft 15. The excess lubricant may be returned to reservoir 48 through passage 104.

The outer terminus of portion 13' may be closed by bearing positioning nut 105, fixed against loosening by lock nut 106.

What is claimed and it is desired to secure by United States Letters Patent is:

1. A windmill comprising a shaft, a swivel axis support for the shaft, a wind wheel outboard from the support on the shaft, an arm having a pivotal connection with the support parallel with the swivel axis and opposite from the wheel, a rudder plane carried by the arm, a bracket fixed with the support, a rockable pin in the bracket having an axis parallel to the axis of the arm, a stem through said pin, a spring connected to the stem and extending to the arm with the pin as rockable to allow the stem to take the direction of the spring, and adjusting means for the stem at the pin.

2. A windmill comprising a shaft, a swivel axis support for the shaft, a wind wheel outboard from the support on the shaft, an arm having a pivotal anti-friction mounting a connection with the support parallel with the swivel axis and opposite from the wheel, and a rudder plane carried by the arm, said anti-friction mounting including a pair of aligned self-lubricating bushings exterior of the housing.

3. A windmill comprising a shaft, a swivel axis support for the shaft, a wind wheel outboard from the support on the shaft, an arm having a pivotal connection with the support parallel with the swivel axis and opposite from the wheel, a rudder plane carried by the arm, a rod slidably connected with the arm and extending to fixed pivotal connection with the support beyond the shaft, and compression spring means on the rod coacting as a bumper to cushion arm swinging limit toward and from the wheel.

4. A windmill comprising a shaft, a swivel axis support for the shaft, a wind wheel outboard from the support on the shaft, an arm having a pivotal connection with the support parallel with the swivel axis and opposite from the wheel, a rudder plane carried by the arm, a pull-out for swinging the arm toward parallelism with the wheel, said pull-out having connection to the arm including means movable as to the arm opposite to the direction of said pull-out operation, a brake for the wheel, an operator for the brake operable by the pull-out through said receding connection as held by the pull-out.

5. A windmill comprising a shaft, a swivel axis suppport for the shaft, a wind wheel outboard from the support on the shaft, an arm having a pivotal connection with the support parallel with the swivel axis and opposite from the wheel, a rudder plane carried by the arm, a pull-out for swinging the arm toward parallelism with the wheel, said pull-out having swingable latch connection adapted to be held against the arm in pull-out operation, a brake for the wheel, an operator for the brake adapted to be engaged by the latch connection and pull-out operation of said brake, and adapted to swing the latch relatively to the arm as free of pull-out operation in arm swinging toward parallelism with the plane of the wheel.

6. A windmill comprising a shaft, a swivel axis support for the shaft, a wind wheel outboard from the support on the shaft, an arm having a pivotal connection with the support parallel with the swivel axis and opposite from the wheel, a rudder plane carried by the arm, a pull-out for swinging the arm toward parallelism with the wheel, a brake drum for the wheel, an external spring band brake for the wheel, a swingable latch carried by the arm, and an operator for throwing the wheel out of the wind by pulling the arm through said latch and thereby causing said latch to set the brake band against the brake drum.

7. A windmill comprising a shaft, a swivel axis support for the shaft, a wind wheel outboard from the support on the shaft, a cross-head guide rising from the support, a reciprocating driven rod rising through the support, transmission from the wind wheel shaft including connecting rod means, a cross-head on the guide to which the connecting rod means and driven rod extend, a swivel connection above the support for the rod at the cross-head, and readily replaceable wear means terminally of the rod.

8. A windmill comprising a shaft, a swivel axis support for the shaft, a wind wheel outboard from the support on the shaft, a transmission at the support from the wind wheel shaft including a cross-head, said support providing a reservoir lubricant, a pump in the reservoir, and pump actuating connection, one with the cross-head and another with the reservoir, there being control means for pump stroke to be less than the cross-head stroke.

9. A windmill comprising a shaft, a swivel axis support for the shaft, a wind wheel outboard from the support on the shaft, a cross-head guide rising from the support, a reciprocating driven rod rising through the support, transmission from the wind wheel shaft including a cross-head on the guide, and a swivel connection above the support for the rod to the cross-head embodying a bearing element replaceably connectable to the rod.

KENNETH R. LUNG.

CERTIFICATE OF CORRECTION.

Patent No. 2,103,910.  December 28, 1937.

KENNETH R. LUNG.

It is hereby certified that error appears in the printed specification of the above numbered patent requiring correction as follows: Page 2, second column, line 73, claim 2, after the word "mounting" insert a comma; page 3, second column, lines 28 and 29, for the words "reservoir lubricant" read lubricant reservoir; and line 30, same claim, after the word "one" insert fixed; and that the said Letters Patent should be read with these corrections therein that the same may conform to the record of the case in the Patent Office.

Signed and sealed this 1st day of February, A. D. 1938.

(Seal)

Henry Van Arsdale,
Acting Commissioner of Patents.